United States Patent
Van Steenis et al.

(10) Patent No.: US 10,144,795 B2
(45) Date of Patent: Dec. 4, 2018

(54) COATING COMPOSITION COMPRISING A POLYISOCYANATE AND A POLYOL

(71) Applicant: Akzo Nobel Coatings International B.V., Arnhem OT (NL)

(72) Inventors: Dirk Jan Vincent Christiaan Van Steenis, Leiden (NL); Hendrik Jan Willem Van Den Haak, Sassenheim (NL); Taco Scherer, Haarlem (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 15/650,256

(22) Filed: Jul. 14, 2017

(65) Prior Publication Data

US 2018/0002475 A1 Jan. 4, 2018

Related U.S. Application Data

(62) Division of application No. 13/125,417, filed as application No. PCT/EP2009/063644 on Oct. 19, 2009, now Pat. No. 9,745,401.

(60) Provisional application No. 61/107,862, filed on Oct. 23, 2008.

(30) Foreign Application Priority Data

Oct. 22, 2008 (EP) .................. 08167269

(51) Int. Cl.

| | | |
|---|---|---|
| *C08G 18/00* | (2006.01) | |
| *C08G 18/08* | (2006.01) | |
| *C08G 18/42* | (2006.01) | |
| *C08G 18/62* | (2006.01) | |
| *C08G 18/83* | (2006.01) | |
| *C08G 18/24* | (2006.01) | |
| *C08G 18/22* | (2006.01) | |
| *C08G 18/38* | (2006.01) | |
| *C08G 18/40* | (2006.01) | |
| *C09D 175/04* | (2006.01) | |

(52) U.S. Cl.
CPC .......... *C08G 18/089* (2013.01); *C08G 18/22* (2013.01); *C08G 18/242* (2013.01); *C08G 18/246* (2013.01); *C08G 18/3876* (2013.01); *C08G 18/4063* (2013.01); *C08G 18/4288* (2013.01); *C08G 18/6254* (2013.01); *C08G 18/834* (2013.01); *C09D 175/04* (2013.01)

(58) Field of Classification Search
CPC .......... C08G 18/3876; C08G 18/834; C08G 18/242; C08G 18/246; C08G 18/4063; C08G 18/6254; C08G 18/4288
See application file for complete search history.

(56) References Cited

U.S. PATENT DOCUMENTS

| | | |
|---|---|---|
| 2,967,117 A | 1/1961 | Arledter et al. |
| 4,788,083 A | 11/1988 | Dammann et al. |
| 5,214,086 A | 5/1993 | Mormile et al. |
| 6,348,121 B1 | 2/2002 | Schoener et al. |
| 2008/0103281 A1* | 5/2008 | Harvey ............ C08F 2/46 528/58 |

FOREIGN PATENT DOCUMENTS

| | | | | |
|---|---|---|---|---|
| EP | 0688840 | 6/1995 | | |
| GB | 2188327 | 9/1987 | | |
| JP | 02151651 A | * 6/1990 | ............ | C08L 75/04 |
| WO | 93/17060 | 2/1993 | | |
| WO | 95/29007 | 11/1995 | | |
| WO | 96/20968 | 7/1996 | | |
| WO | 96/040813 | 12/1996 | | |
| WO | 97/31073 | 8/1997 | | |
| WO | 98/15585 | 4/1998 | | |
| WO | 04/031256 | 4/2004 | | |
| WO | 05/035613 | 4/2005 | | |
| WO | 07/0020269 | 2/2007 | | |
| WO | 07/020270 | 2/2007 | | |

OTHER PUBLICATIONS

JP-02151651-A English Translation. Jun. 1990.*
International Search Report, PCT/EP2009/063644, dated Nov. 23, 2009, 4 pages.

* cited by examiner

*Primary Examiner* — Michael L Leonard
(74) *Attorney, Agent, or Firm* — McDonnell Boehnen Hulbert & Berghoff LLP

(57) ABSTRACT

The invention relates to a non-aqueous coating composition comprising
  a. a polyisocyanate,
  b. a polyol having an average functionality of more than 3 hydroxyl groups per molecule,
  c. a metal based curing catalyst for the addition reaction of isocyanate groups and hydroxyl groups, and
  d. a mercapto carboxylic acid,
wherein the coating composition does not contain a carboxylic acid wherein the carbonyl group of the carboxylic acid is in conjugation with a π-electron system.

16 Claims, No Drawings

COATING COMPOSITION COMPRISING A POLYISOCYANATE AND A POLYOL

REFERENCE TO RELATED APPLICATION(S)

This application is a divisional application of U.S. patent application Ser. No. 13/125,417 filed on Apr. 21, 2011, which is a U.S. national phase application of international Patent Application no. PCT/EP2009/063644 filed on Oct. 19, 2009, which claims the benefit U.S. Provisional Application No. 61/107,862 filed Oct. 23, 2008, the specification, claims, abstract, and drawings (if any) of each of which is hereby incorporated into the present specification by reference.

The invention relates to a coating composition comprising a polyisocyanate, a polyol, a metal based catalyst for the addition reaction of isocyanate groups and hydroxyl groups, and a thiol-functional compound. The invention also relates to a kit of parts for preparation of the coating composition and to the use of the composition.

WO 2007/020270 describes a coating composition comprising a polyisocyanate, a polyol, a metal based catalyst for the addition reaction of isocyanate groups and hydroxyl groups, a thiol-functional compound, and a carboxylic acid wherein the carbonyl group of the carboxylic acid is in conjugation with π-electron system.

GB 2188327 A relates to polyol/polyisocyanate coating compositions and more particularly to a catalyst system effective therefor. The catalyst system comprises the reaction product of a metal catalyst and a molar excess of a complexing agent. The complexing agent is a mercapto compound or a polyphenol. This document discloses coating compositions containing a tri-functional polyol, a polyisocyanate, dibutyl tin dilaurate, and various mercaptans. Mercaptans with carboxyl functionality are reported to shorten the pot life of the formulation.

Although coatings with acceptable properties can be prepared from the known composition, there is an ongoing need for further improvement of the balance of pot life, appearance properties, curing rate, and hardness of the cured coatings, in particular in cases where a high or very high non-volatile content, i.e. a low content of volatile organic compounds (VOC), is required. Furthermore, in practice coatings are applied under various conditions of ambient temperature and atmospheric moisture. An improved balance of desirable properties should be achieved under various application conditions. Using a lower amount of curing catalyst decreases the risk of coating defects caused by entrapped solvents and/or gases. However, it leads to longer drying times and decreased hardness of the coatings as well, with the risk of sagging and/or dirt pick-up. Longer drying times are undesirable in view of the high throughput of coating operations. Furthermore, low VOC coating compositions comprising a high curing catalyst load to obtain a short drying time suffer from foam stabilization in the drying coating, leading to pinholes in the dried coating layer. Pinholes detract from the appearance and durability of coating layers. Thus, a very good balance of high curing rate, long pot life, low VOC content, and good appearance and hardness of the cured coating cannot be achieved with the known coating compositions.

Accordingly, the invention seeks to provide a coating composition having a favourable balance of properties, i.e. a low content of volatile organic solvent at application viscosity, a high cure speed, and a long pot life, leading to coatings with good appearance properties, in particular a low susceptibility to pinholes, and good hardness. In addition, the coating composition should also provide cured coatings exhibiting other properties required for motor vehicle exterior finishes, such as flexibility, scratch resistance, gloss, durability, and resistance to chemicals and UV radiation.

The invention now provides a coating composition comprising
 a. a polyisocyanate,
 b. a polyol having an average functionality of more than 3 hydroxyl groups per molecule,
 c. a metal based curing catalyst for the addition reaction of isocyanate groups and hydroxyl groups, and
 d. a mercapto carboxylic acid,
wherein the coating composition does not contain a carboxylic acid wherein the carbonyl group of the carboxylic acid is in conjugation with a π-electron system.

The coating composition of the invention provides a favourable balance of properties, i.e. a low content of volatile organic solvent at application viscosity, a high cure speed, and a long pot life, leading to coatings with good appearance properties, in particular a low susceptibility to pinholes, and good hardness. In addition, the coating composition also provides cured coatings exhibiting other properties required for motor vehicle exterior finishes, such as flexibility, scratch resistance, gloss, durability, and resistance to chemicals and UV radiation.

Suitable isocyanate-functional crosslinkers for use in the coating composition are isocyanate-functional compounds comprising at least two isocyanate groups. Preferably, the isocyanate-functional crosslinker is a polyisocyanate, such as an aliphatic, cycloaliphatic or aromatic di-, tri- or tetra-isocyanate. Examples of diisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate (Desmodur® W), toluene diisocyanate, 1,3-bis(isocyanatomethyl) benzene, xylylene diisocyanate, α,α,α',α'-tetramethyl xylylene diisocyanate (TMXDI®), 1,5-dimethyl-2,4-bis(2-isocyanatoethyl) benzene, 1,3,5-triethyl-2,4-bis(isocyanatomethyl) benzene, 4,4'-diisocyanato-diphenyl, 3,3'-dichloro-4,4'-diisocyanato-diphenyl, 3,3'-diphenyl-4,4'-diisocyanato-diphenyl, 3,3'-dimethoxy-4,4'-diisocyanato-diphenyl, 4,4'-diisocyanato-diphenyl methane, 3,3'-dimethyl-4,4'-diisocyanato-diphenyl methane, and diisocyanatonaphthalene. Examples of triisocyanates include 1,3,5-triisocyanatobenzene, 2,4,6-triisocyanatotoluene, 1,8-diisocyanato-4-(isocyanatomethyl) octane, and lysine triisocyanate. Adducts and oligomers of polyisocyanates, for instance biurets, isocyanurates, allophanates, uretdiones, urethanes, and mixtures thereof are also included. Examples of such oligomers and adducts are the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, the adduct of 1 molecule of pentaerythritol to 4 molecules of toluene diisocyanate, the adduct of 3 moles of m-α,α,α',α'-tetramethyl xylene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret of 1,6-diisocyanatohexane, the allophanate of 1,6-diisocyanatohexane, and mixtures thereof. Furthermore, (co)polymers of isocyanate-functional monomers such as α,α'-dimethyl-m-isopropenyl benzyl isocyanate are suitable for use.

The coating composition further comprises a polyol having an average functionality of more than 3 hydroxyl groups per molecule. These may be monomers, oligomers, polymers, and mixtures thereof. Oligomers and polymers are generally preferred. Examples of suitable polymers include polyester polyols, polyacrylate polyols, polycarbonate polyols, polyurethane polyols, melamine polyols, and mixtures and hybrids thereof. Such polymers are generally known to the skilled person and are commercially available. Suitable polyester polyols, polyacrylate polyols, and mixtures thereof are for example described in International patent application WO 96/20968 and in European patent application EP 0688840 A. Examples of suitable polyurethane polyols are described in International patent application WO 96/040813.

Further examples include hydroxy-functional epoxy resins, alkyds, and dendrimeric polyols such as described in International patent application WO 93/17060.

In one embodiment, the polyol has an average functionality of at least 4 hydroxyl groups per molecule, or at least 5 hydroxyl groups per molecule. Generally, the polyol has an average functionality of at most 20 hydroxyl groups per molecule. In other embodiments, the polyol has an average functionality of at most 15, or at most 10, hydroxyl groups per molecule.

The coating composition can additionally comprise latent hydroxy-functional compounds such as compounds comprising bicyclic orthoester, spiro-orthoester, spiro-ortho silicate groups, or bicyclic amide acetals. These compounds and their use are described in International patent applications WO 97/31073, WO 2004/031256, and WO 2005/035613, respectively.

In one embodiment, the coating composition comprises a polyester polyol having an average functionality of more than 3 hydroxyl groups per molecule and a polyacrylate polyol having an average functionality of more than 3 hydroxyl groups per molecule.

As mentioned above, the coating composition of the invention also comprises a metal based catalyst for the addition reaction of isocyanate groups and hydroxyl groups. Such catalysts are known to the skilled person. The catalyst is generally used in an amount of 0.001 to 10 weight-%, preferably 0.002 to 5 weight-%, more preferably in an amount of 0.01 to 1 weight-%, calculated on the non-volatile matter of the coating composition. Suitable metals in the metal based catalyst include zinc, cobalt, manganese, zirconium, bismuth, and tin. Tin, bismuth and zirconium based catalysts have been found to perform particularly well. It is preferred that the coating composition comprises a tin based catalyst. Well-known examples of tin based catalysts are dimethyl tin dilaurate, dimethyl tin diversatate, dimethyl tin dioleate, dibutyl tin dilaurate, dioctyl tin dilaurate, and tin octoate.

As mentioned above, the coating composition comprises a mercapto carboxylic acid as essential ingredient. Mercapto carboxylic acids are carboxylic acids which also have a mercapto group in the molecule. Without wishing to be bound by any theory, it is believed that mercapto carboxylic acids are capable of forming a chelate type complex with the metal atoms of the metal based catalyst. Such complex formation is further believed to cause a temporary deactivation of the metal based catalyst. It has further been found that particularly favourable results can be obtained with 2-mercapto-carboxylic acids and 3-mercapto carboxylic acids. These mercapto carboxylic acids have been found to lead to longer open times of the applied coatings, leaving more time for entrapped gas bubbles to escape. These mercapto carboxylic acids are believed to act as bidentate ligands for the metal atoms of the metal based curing catalyst. Examples of suitable mercapto carboxylic acids include methylthioglycolate, 2-mercaptoacetic acid, mercaptosuccinic acid, cysteine, 3-mercaptopropionic acid, 2-mercaptopropionic acid, 11-mercaptoundecanoic acid, and 2,3-dimercaptosuccinic acid.

The mercapto carboxylic acid is generally present in an amount of 0.1 to 18 weight-%, preferably 0.2 to 10 weight-%, more preferably in an amount of 0.3 to 5 weight-%, calculated on the non-volatile matter of the coating composition. The actual amount of mercapto carboxylic acid depends on the type and amount of metal based catalyst employed, on the thiol equivalent weight of the mercapto carboxylic acid, and on the desired property profile of the coating composition. In some embodiments it can be beneficial to use the mercapto carboxylic acid in such an amount that the composition comprises a molar excess of thiol groups over the metal atoms of the metal based catalyst.

As mentioned above, the mercapto carboxylic acids are believed to act as bidentate ligands for the metal atoms of the metal based curing catalyst, forming a cyclic complex. It has been found that instead of including the metal based curing catalyst and the mercapto carboxylic acid as separate components in the coating composition, it is also possible to pre-mix the mercapto carboxylic acid and the metal based curing catalyst, which upon mixing form a reaction product which can as such been included in the coating composition. Therefore, in another embodiment, the invention also relates to a non-aqueous coating composition comprising
  a. a polyisocyanate,
  b. a polyol having an average functionality of more than 3 hydroxyl groups per molecule, and
  c. the reaction product of
    i) a metal based curing catalyst for the addition reaction of isocyanate groups and hydroxyl groups and
    ii) a mercapto carboxylic acid,
wherein the coating composition does not contain a carboxylic acid wherein the carbonyl group of the carboxylic acid is in conjugation with π-electron system.

In the coating composition according to the invention the equivalent ratio of isocyanate-functional groups to hydroxyl groups suitably is between 0.5 and 4.0, preferably between 0.7 and 3.0, and more preferably between 0.8 and 2.5. Generally, the weight ratio of hydroxy-functional binders to isocyanate-functional crosslinker in the coating composition, based on non-volatile content, is between 85:15 and 15:85, preferably between 70:30 and 30:70.

The liquid coating composition may be used and applied without a volatile diluent, in particular when low molecular weight binders, optionally in combination with one or more reactive diluents, are used. Alternatively, the coating composition may optionally comprise a volatile organic solvent. Preferably, the coating composition comprises less than 500 g/l of volatile organic solvent based on the total composition, more preferably less than 480 g/l, and most preferably 420 g/l or less. The non-volatile content of the composition, usually referred to as the solid content, preferably is higher than 50 weight-% based on the total composition, more preferably higher than 54 weight-%, and most preferably higher than 60 weight-%.

Examples of suitable volatile organic diluents are hydrocarbons, such as toluene, xylene, Solvesso 100, ketones, terpenes, such as dipentene or pine oil, halogenated hydrocarbons, such as dichloromethane, ethers, such as ethylene glycol dimethyl ether, esters, such as ethyl acetate, ethyl propionate, n-butyl acetate or ether esters, such as methoxypropyl acetate or ethoxyethyl propionate. Also mixtures of these compounds can be used.

If so desired, it is possible to include one or more so-called "exempt solvents" in the coating composition. An exempt solvent is a volatile organic compound that does not participate in an atmospheric photochemical reaction to form smog. It can be an organic solvent, but it takes so long to react with nitrogen oxides in the presence of sunlight that the Environmental Protection Agency of the United States of America considers its reactivity to be negligible. Examples of exempt solvents that are approved for use in paints and coatings include acetone, methyl acetate, parachlorobenzotrifluoride (commercially available under the name Oxsol 100), and volatile methyl siloxanes. Also tertiary butyl acetate is being considered as an exempt solvent.

In addition to the components described above, other compounds can be present in the coating composition according to the present invention. Such compounds may be binders and/or reactive diluents, optionally comprising reactive groups which may be crosslinked with the aforesaid hydroxy-functional compounds and/or isocyanate-functional crosslinkers. Examples of such other compounds are ketone resins, aspargyl acid esters, and latent or non-latent amino-functional compounds such as oxazolidines, ketimines, aldimines, diimines, secondary amines, and polyamines. These and other compounds are known to the skilled person and are mentioned, int. al., in U.S. Pat. No. 5,214,086.

The coating composition may further comprise other ingredients, additives or auxiliaries commonly used in coating compositions, such as pigments, dyes, surfactants, pigment dispersion aids, levelling agents, wetting agents, anticratering agents, antifoaming agents, antisagging agents, heat stabilizers, light stabilizers, UV absorbers, antioxidants, and fillers.

The coating composition of the invention can be applied to any substrate. The substrate may be, for example, metal, e.g., iron, steel, and aluminium, plastic, wood, glass, synthetic material, paper, leather, or another coating layer. The other coating layer can be comprised of the coating composition of the current invention or it can be a different coating composition. The coating compositions of the current invention show particular utility as clear coats, base coats, pigmented top coats, primers, and fillers. When the coating composition of the invention is a clear coat, it is preferably applied over a colour- and/or effect-imparting base coat. In that case, the clear coat forms the top layer of a multi-layer lacquer coating such as typically applied on the exterior of automobiles. The base coat may be a water borne base coat or a solvent borne base coat.

The coating compositions are suitable for coating objects such as bridges, pipelines, industrial plants or buildings, oil and gas installations, or ships. The compositions are particularly suitable for finishing and refinishing automobiles and large transportation vehicles, such as trains, trucks, buses, and airplanes.

The applied coating composition can be cured at ambient temperature, for example between about 10° C. and about 40° C. Alternatively, curing can be carried out at elevated temperature, for example in the range of about 40° C. to about 80° C. Curing at a temperature of about 60° C. has been found to be particularly favourable. If so desired, the coating composition may be oven cured. Alternatively, curing may be supported by (near) infrared radiation. Before curing at elevated temperature the applied coating composition may optionally be subjected to a flash-off phase to evaporate at least a part of the volatile solvent present in the coating composition.

It is to be understood that the term coating composition as used herein also includes its use as adhesive composition.

As is usual with coating compositions comprising a hydroxy-functional binder and an isocyanate-functional crosslinker, the composition according to the invention has a limited pot life. Therefore, the composition is suitably provided as a multi-component composition, for example as a two-component composition or as a three-component composition. Therefore, the invention also relates to a kit of parts for preparation of the coating composition comprising
   a) a binder module comprising a polyol having an average functionality of more than 3 hydroxyl groups per molecule,
   b) a crosslinker module comprising a polyisocyanate, and
   c) optionally, a diluent module comprising a volatile organic solvent,
wherein a metal based catalyst for the addition reaction of isocyanate groups and hydroxyl groups and a mercapto carboxylic acid are distributed, individually or in combination, over one or more of the modules.

In a preferred embodiment, the metal based catalyst for the addition reaction of isocyanate groups and hydroxyl groups and the mercapto carboxylic acid are distributed, individually or in combination, over one or more of modules a) and c). Providing the components of the composition in the form of a kit of parts has the additional advantage that the components can be provided in the required molar ratios. Hence, the risk of errors caused by incorrect mixing ratios of the individual components is minimized.

EXAMPLES

Unless stated otherwise, the properties of the liquid coating compositions or the resulting coating films were determined as described below.

The DINC4 viscosity was measured in a DIN Flow cup (number 4). The viscosity is given in seconds.

The volatile organic content (VOC) was calculated theoretically from the solvent content of the coating compositions.

The Enamel Hold Out (EHO) was determined as the total visual appearance. Each sample was rated for visual appearance on a scale of 1 to 10 (1=very bad, 10=excellent). The determination takes into account gloss, wrinkling, flow, and image clarity/distinctness of image. The average number will give the EHO.

The pinhole sensitivity was determined visually. Each sample was rated on a scale of 1 to 10 at comparable layer thicknesses of the coating (1=very bad, 10=excellent).

The warm tackiness was determined manually after 5 minutes at the end of the 60-65° C. cure cycle. Each sample was rated on a scale of 1 to 10 at comparable layer thicknesses of the coating (1=very bad, 10=excellent).

The open times were determined with a BK drying recorder. The drying recorder measurements were done to determine the drying rate and the open time of freshly applied coatings at the indicated temperature. With the drying recorder four different phases can be distinguished:
Phase 1: The needle track reflows to a closed film.

Phase 2: The needle track is regular and does not reflow to a closed film. The coating is damaged down to the substrate.
Phase 3: The needle track is irregular, with incidental damage down to the substrate.
Phase 4: The needle track is regular again, but the coating shows only superficial damage. At the end of stage 4 no damage is observed at all.

The coating layers used for the drying recorder experiments were applied with a K-Controle coating apparatus.

The Persoz hardness was measured according to ISO 1522.

The polyester polyol with a functionality of 2.8 which was used in the examples was prepared as described in international patent publication WO 2007/0020269, p. 22, Example E2.

The polyacrylate polyols used in the Examples were in an analogous way as described in international patent publication WO 2007/0020269, p. 19, 1. 16-p. 21, Examples A1-A4.

Abbreviations
2-MPA 2-Mercaptopropionic acid
3-MPA 3-Mercaptopropionic acid
TGA Thioglycolic acid
E2-MPA Ethyl-2-mercaptopropionate
E3-MPA Ethyl-3-mercaptopropionate
DBTL Dibutyl tin dilaurate
NVC Non-volatile content
Tolonate HDT LV Aliphatic polyisocyanate HDI trimer ex Rhodia ppmc
Desmodur XP 2511 Aliphatic polyisocyanate HDI trimer ex Bayer Material Science Ag
BYK 331 Polydimethyl siloxane polyether (modified) additive, ex BYK Chemie GmbH
BYK 355 Polyacrylate solution, ex BYK Chemie GmbH
Vestanat T1890 E Cycloaliphatic polyisocyanate, ex Evonik Degussa GmbH
BYK 392 Acrylate copolymer additive, ex BYK Chemie GmbH
Exxsol D30 Naphta (petroleum), ex Exxon Mobil Chemical Company
Butylcellosolve® acetate 2-Butoxyethyl acetate, ex DOW Chemical Company Ltd.
PTMP Pentaerythritol tetrakis (3-mercaptopropionate)
Tolonate HDT LV 2 Aliphatic polyisocyanate HDI, ex Rhodia ppmc
SBP 140/165 Naphta (petroleum), ex Shell Chemicals Europe B.V.
Byk 320 Polymethyl-alkylsiloxane, polyether (modified) additive, ex BYK Chemie GmbH
Tinuvin 1130 Benzotriazole derivative mixture, ex Ciba Specialty Chemicals
Tinuvin 292 Hindered amine light stabilizer, ex Ciba Specialty Chemicals
$T_g$ Glass transition temperature (° C.)
f(OH) Average OH functionality Example 1

Six clearcoat compositions were prepared by mixing the components in the weight proportions as indicated in Table 1. The molar ratio of isocyanate groups to hydroxyl groups was adjusted to 1.25:1. The clear coat compositions of Table 1 all contained the following additives:
0.6 parts by weight Tinuvin 1130
1.1 parts by weight Tinuvin 292
0.1 part by weight BYK 331
0.1 part by weight BYK 355

TABLE 1

| Clear coat composition | E1.1 | E1.2 | E1.3 | E1.4 | E1.5 | E1.6 |
| --- | --- | --- | --- | --- | --- | --- |
| Acrylic polyol (f(OH) = 6.2; NVC = 65%, $T_g$ = 29° C.) | 55.6 | 55.6 | 55.6 | 55.6 | 55.6 | 55.6 |
| Polyester polyol (f(OH) = 2.8; NVC = 100%; $T_g$ = −59° C.) | 19.9 | 19.9 | 19.9 | 19.9 | 19.9 | 19.9 |
| n-butylacetate | 16.1 | 16.1 | 16.1 | 16.1 | 16.1 | 16.1 |
| Ethyl-ethoxy-propionate | 0.9 | 0.9 | 0.9 | 0.9 | 0.9 | 0.9 |
| SBP 140/165 | 4.5 | 4.5 | 4.5 | 4.5 | 4.5 | 4.5 |
| Tolonate HDT LV/Desmodur XP 2511 | 44.9 | 44.9 | 44.9 | 44.9 | 44.9 | 44.9 |
| Ethyl-ethoxy-propionate | 9.6 | 9.6 | 9.6 | 9.6 | 9.6 | 9.6 |
| n-butylacetate | 9.6 | 9.6 | 9.6 | 9.6 | 9.6 | 9.6 |
| DBTL | 0.22 | 0.22 | 0.22 | 0.22 | 0.22 | 0.22 |
| Methyl-amylketone | 6.2 | 5.3 | 6.6 | 5.9 | 6.7 | 6.0 |
| SBP 140/165 | 8.9 | 8.9 | 8.9 | 8.9 | 8.9 | 8.9 |
| BYK-392 | 0.49 | 0.49 | 0.49 | 0.49 | 0.49 | 0.49 |
| n-butylacetate | — | 0.87 | — | 0.87 | — | 0.87 |
| 2-Mercaptopropionic acid | — | — | 0.24 | 0.24 | 0.12 | 0.12 |
| PTMP | 0.28 | 0.28 | — | — | — | — |
| Benzoic Acid | 0.28 | 0.28 | — | — | — | — |
| DBTL | — | 0.1 | — | 0.1 | — | 0.1 |
| VOC (g/l) | ≤420 | ≤420 | ≤420 | ≤420 | ≤420 | ≤420 |
| Acrylic polyol (f(OH) = 6.2; NVC = 65%, $T_g$ = 29° C.) | 55.6 | 55.6 | 55.6 | 55.6 | 55.6 | 55.6 |
| Polyester polyol (f(OH) = 2.8; NVC = 100%; $T_g$ = −59° C.) | 19.9 | 19.9 | 19.9 | 19.9 | 19.9 | 19.9 |
| n-butylacetate | 16.1 | 16.1 | 16.1 | 16.1 | 16.1 | 16.1 |
| Ethyl-ethoxy-propionate | 0.9 | 0.9 | 0.9 | 0.9 | 0.9 | 0.9 |
| SBP 140/165 | 4.5 | 4.5 | 4.5 | 4.5 | 4.5 | 4.5 |
| Tolonate HDT LV/Desmodur XP 2511 | 44.9 | 44.9 | 44.9 | 44.9 | 44.9 | 44.9 |
| Ethyl-ethoxy-propionate | 9.6 | 9.6 | 9.6 | 9.6 | 9.6 | 9.6 |
| n-butylacetate | 9.6 | 9.6 | 9.6 | 9.6 | 9.6 | 9.6 |
| DBTL | 0.22 | 0.22 | 0.22 | 0.22 | 0.22 | 0.22 |
| Methyl-amylketone | 6.2 | 5.3 | 6.6 | 5.9 | 6.7 | 6.0 |
| SBP 140/165 | 8.9 | 8.9 | 8.9 | 8.9 | 8.9 | 8.9 |
| BYK-392 | 0.49 | 0.49 | 0.49 | 0.49 | 0.49 | 0.49 |

TABLE 1-continued

| Clear coat composition | E1.1 | E1.2 | E1.3 | E1.4 | E1.5 | E1.6 |
|---|---|---|---|---|---|---|
| n-butylacetate | — | 0.87 | — | 0.87 | — | 0.87 |
| 2-Mercaptopropionic acid | — | — | 0.24 | 0.24 | 0.12 | 0.12 |
| PTMP | 0.28 | 0.28 | — | — | — | — |
| Benzoic Acid | 0.28 | 0.28 | — | — | — | — |
| DBTL | — | 0.1 | — | 0.1 | — | 0.1 |
| VOC (g/l) | ≤420 | ≤420 | ≤420 | ≤420 | ≤420 | ≤420 |

The clear coat compositions were based on two different DBTL blocking systems, namely PTMP/benzoic acid (E1.1, E1.2) and 2-MPA (E1.3 to E1.6). In samples E1.5 and E1.6 the amount of 2-MPA was half that in samples E1.3 and E1.4. In samples E1.2, E1.4 and E1.6 the amount of DBTL was increased. 2-MPA was used in equal molar quantities compared to benzoic acid. PTMP was used in equal molar SH quantities.

TABLE 2

Viscosity development of samples E1.1 to E1.6 at 20° C.

| Sample | $T_{0\ min}$ | $T_{15\ min}$ | $T_{30\ min}$ | $T_{45\ min}$ |
|---|---|---|---|---|
| E1.1 | 16.1 | 17.3 | 23.4 | 38.1 |
| E1.2 | 16.1 | 17.6 | 25.9 | 46.5 |
| E1.3 | 16.1 | 16.1 | 16.3 | 16.7 |
| E1.4 | 16.0 | 16.0 | 16.5 | 17.3 |
| E1.5 | 15.9 | 15.9 | 16.6 | 18.5 |
| E1.6 | 15.8 | 15.8 | 17.1 | 20.0 |

From Table 2 it can be inferred that the viscosity increase of samples E1.1 and E1.2 is the fastest in time. Samples E.1.3 and E1.4 have the slowest viscosity increase in time, followed by samples E.1.5 and 1.6.

The blocking behaviour of 2-MPA is better than the PTMP/benzoic acid catalyst blocking system. Even with higher amounts of DBTL and half the amount of 2-MPA (sample E1.6) the viscosity increase is slower than in sample E1.1. A slower viscosity increase indicates a longer pot life. In addition, the use of 2-MPA over PTMP/benzoic acid is preferred from an economic point of view.

Drying recorder experiments at 60° C. and 20° C. are in line with the viscosity increase experiments of Table 2. Sample E1.3 has the longest open time (the slowest viscosity increase).

A long open time is advantageous for air and solvent escape from the coating layer. Samples E1.1, E1.3, and E1.5 are directly comparable.

TABLE 3

Drying recorder results at 60° C.

| Sample | Phase 1 (cm) | Phase 2 (cm) | Phase 3 (cm) |
|---|---|---|---|
| E1.1 | 1.3 | 0.2 | 1.7 |
| E1.3 | 3.4 | 0.5 | 2.3 |
| E1.5 | 3.1 | 0.4 | 1.8 |

TABLE 4

Drying recorder results at 20° C.

| Sample | Phase 1 (cm) | Phase 2 (cm) | Phase 3 (cm) |
|---|---|---|---|
| E1.1 | 1.8 | 0.4 | 1.7 |
| E1.3 | 4.7 | 2.5 | 5.7 |
| E1.5 | 3.1 | 2.7 | 5.7 |

Example 2

A clear coat composition was prepared by mixing the components in the weight proportions as indicated in Table 5. The molar ratio of isocyanate groups:hydroxyl groups was adjusted to 1.03:1. The clearcoat compositions of Table 5 below contained the following additives:
  0.6 parts by weight Tinuvin 1130
  1.0 part by weight Tinuvin 292
  0.1 part by weight BYK 331
  1.0 part by weight BYK 392

TABLE 5

| Clear coat compositions | E2.1 | E2.2 | E2.3 | E2.4 |
|---|---|---|---|---|
| Acrylic polyol (f(OH) = 6.2; NVC = 75%, $T_g$ = −12° C.) | 52.3 | 52.3 | 52.3 | 52.3 |
| Polyester polyol (f(OH) = 2.8; NVC = 100%, $T_g$ = −59° C.) | 19.9 | 19.9 | 19.9 | 19.9 |
| n-butylacetate | 25 | 25 | 25 | 25 |
| Ethyl-ethoxy-propionate | 0.9 | 0.9 | 0.9 | 0.9 |
| DBTL | 0.2 | 0.2 | 0.2 | 0.2 |
| Tolonate HDT LV 2 | 33.6 | 33.6 | 33.6 | 33.6 |
| Vestanat T1890 E | 12.8 | 12.8 | 12.8 | 12.8 |
| Methyl-isoamyl-ketone | 3.5 | 3.5 | 3.5 | 3.5 |
| n-butylacetate | 3.5 | 3.5 | 3.5 | 3.5 |
| n-butylacetate | 14.3 | 14.1 | 13.7 | 14.4 |
| Xylene | 5.2 | 5.2 | 5.2 | 5.2 |
| Butylcellosolve ® acetate | 5.2 | 5.2 | 5.2 | 5.2 |
| 2-Mercapto-ethanol | | | | 0.29 |
| 2-MPA | 0.39 | | | |
| Benzoic acid | | | 0.45 | |
| PTMP | | 0.45 | 0.45 | |
| VOC gr/L | ≤420 | ≤420 | ≤420 | ≤420 |

The clear coat compositions were based on 4 different DBTL blocking components, namely 2-MPA (E2.1, according to the invention), PTMP (E2.2, comparative), PTMP/benzoic acid (E2.3, comparative), and 2-mercapto-ethanol (E2.4, comparative). The catalyst blocking agents were used in equal molar quantities or, in the case of PTMP, replaced by equal molar SH quantities.

The clearcoat compositions were sprayed by a coating robot, 30 minutes after mixing, at 25° C. and 75-80% relative humidity. Aluminium panels were used as a substrate. The substrates were pre-coated successively with a chromate-free etch primer, a non-sanding filler, and a water borne metallic base coat. Once the coating had been applied, the panels were immediately transferred to an oven kept at 60° C. without intermediate flash-off time.

TABLE 6

Visual/physical characteristics of the clear coat compositions

| Sample | EHO | Flow | Warm tackiness | Persoz hardness (after 20 hours) |
|---|---|---|---|---|
| E2.1 | 8 | 8 | 7 | 38 |
| E2.2 | 6-7 | 7 | 8 | 37 |
| E2.3 | 7 | 7 | 8 | 35 |
| E2.4 | 2 | 2 | 8 | 35 |

Sample E2.1 according to the invention was judged to be the best among the four samples. The Enamel Hold Out and the flow were better than in the case of the comparative Examples. The warm tackiness of sample E2.1 was rated to be 7. The warm tackiness of samples E2.2-E2.4 was rated to be 8.

The formulation E2.1, containing 2-MPA, has the longest open time, at both 20° and 60° C. A long open time is advantageous for the flow of a coating and for air and solvent escape from the coating layer. A proper solvent and air escape is advantageous for the EHO.

TABLE 7

Open time at 20° C.

| | Phase 1 (cm) | Phase 2 (cm) | Phase 3 (cm) |
|---|---|---|---|
| E2.1 | 5.4 | 0.9 | 2.2 |
| E2.2 | 3.0 | 0.4 | 1.0 |
| E2.3 | 3.4 | 0.4 | 1.9 |
| E2.4 | 2.9 | 0.4 | 0.9 |

TABLE 8

Open time at 60° C.

| | Phase 1 (cm) | Phase 2 (cm) | Phase 3 (cm) |
|---|---|---|---|
| E2.1 | 2.3 | 0.3 | 2.0 |
| E2.2 | 1.6 | 0.3 | 1.5 |
| E2.3 | 1.8 | 0.3 | 2.0 |
| E2.4 | 1.3 | 0.3 | 1.3 |

Example 3

Five clear coat compositions were prepared by mixing the components in the weight proportions as indicated in Table 9.

The clear coat compositions of Table 9 below contained the following additives:

0.6 parts by weight Tinuvin 1130
1.1 parts by weight Tinuvin 292
0.1 part by weight BYK 331
0.1 part by weight BYK 355

TABLE 9

| Clear coat composition | E3.1 | E3.2 | E3.3 | E3.4 | E3.5 |
|---|---|---|---|---|---|
| Acrylic polyol (f(OH) = 6.2; NVC = 65%, $T_g$ = 29° C.) | 55.6 | 55.6 | 55.6 | 55.6 | 55.6 |
| Polyester polyol (f(OH) = 2.8; NVC = 100%; $T_g$ = −59° C.) | 19.9 | 19.9 | 19.9 | 19.9 | 19.9 |
| n-butylacetate | 16.1 | 16.1 | 16.1 | 16.1 | 16.1 |
| Ethyl-ethoxy-propionate | 0.9 | 0.9 | 0.9 | 0.9 | 0.9 |
| SBP 140/165 | 4.5 | 4.5 | 4.5 | 4.5 | 4.5 |
| Tolonate HDT LV/Desmodur XP 2511 | 44.9 | 44.9 | 44.9 | 44.9 | 44.9 |
| Ethyl-ethoxy-propionate | 9.6 | 9.6 | 9.6 | 9.6 | 9.6 |
| n-butylacetate | 9.6 | 9.6 | 9.6 | 9.6 | 9.6 |
| DBTL | 0.22 | 0.22 | 0.22 | 0.22 | 0.22 |
| 2-MPA | 0.24 | | | | |
| E2-MPA | | 0.31 | | | |
| 3-MPA | | | 0.24 | | |
| E3-MPA | | | | 0.31 | |
| TGA | | | | | 0.21 |
| SBP 100-140 | 9 | 9 | 9 | 9 | 9 |
| Methyl amyl ketone | 6 | 6 | 6 | 6 | 6 |
| VOC g/l | ≤420 | ≤420 | ≤420 | ≤420 | ≤420 |

The clear coat compositions were based on 5 different DBTL blocking components, namely 2-MPA (E3.1, according to the invention), E2-MPA (E3.2, comparative), 3-MPA (E3.3, according to the invention), E3-MPA (E3.4, comparative), and TGA (E3.5, according to the invention). All blocking agents were used in equal molar quantities, and are therefore directly comparable.

Below, the viscosity development at 20° C. of samples E3.1 to E3.5 measured by DIN cup 4 is summarized

TABLE 10

Viscosity increase (pot life) DC 4, 20° C.

| Sample | $T_{0\ min}$ | $T_{15\ min}$ | $T_{30\ min}$ | $T_{45\ min}$ | $T_{60\ min}$ | $T_{75\ min}$ |
|---|---|---|---|---|---|---|
| E3.1 | 15.6 | 16.0 | 16.4 | 16.7 | 17.1 | 17.6 |
| E3.2 | 15.6 | 16.0 | 16.8 | 18.5 | 22.5 | 32.9 |
| E3.3 | 15.5 | 16.0 | 16.3 | 17.3 | 18.2 | 20.9 |
| E3.4 | 15.5 | 16.0 | 17.0 | 19.3 | 25.3 | 44.3 |
| E3.5 | 15.7 | 16.0 | 16.3 | 16.7 | 17.3 | 18.0 |

From Table 10 it is evident that sample E3.1 has the lowest viscosity after 75 minutes. The compositions according to the invention containing 2-mercapto-carboxylic acid (E3.1 and E3.5) have a lower viscosity after 75 minutes compared to the comparative formulations containing the ethyl ester of 2-mercapto-carboxylic acid functionality (E3.2). The same trend of viscosity development is observed between samples E3.3 (slowest) and E3.4 (fastest). The samples E3.1, E3.3, and E3.5 demonstrate that a thiol and carboxylic acid functionality in close proximity is beneficial for good catalyst blocking behaviour. This phenomenon can most likely be explained by bidentate-coordination of the thiol-carboxylic acid ligand towards the catalyst.

Drying recorder experiments at 60° C. show the same observations as in the case of the pot life experiments; the formulation containing 2-MPA has the slowest viscosity development.

TABLE 11

Drying recorder at 60° C.:

| Sample | Phase 1 (cm) | Phase 2 (cm) | Phase 3 (cm) |
|---|---|---|---|
| E3.1 | 3.1 | 0.6 | 1.4 |
| E3.2 | 1.6 | 0.3 | 1.2 |
| E3.3 | 1.8 | 0.2 | 2.1 |
| E3.4 | 1.3 | 0.3 | 0.9 |
| E3.5 | 2.6 | 0.5 | 1.1 |

Example 4

Using the Lesonal™ HS 420 top coat line two car body resprays were performed according to the technical data sheet of the product. The Lesonal HS 420 top coat line is a ≤420 gr/l solvent borne polyester/polyacrylate polyol-isocyanate top coat system, especially designed for the car refinish market. Polyester polyol: f(OH)=4.4; NVC=80%; $t_g$=−2° C. Polyacrylate polyol: f(OH)=4.1; NVC=74%, $t_g$=20° C. The red colour RAL 3020 was selected as A-component and prepared from the Lesonal™ HS 420 top coat toner assortment. Organic pigmented (e.g. red/blue) A-components are known to have high pinhole sensitivity. The Lesonal™ HS420 hardener was used as the hardener for both samples. One top coat ready-to-spray mixture was finished with sample E4.1 (comparative), the other sample was finished with sample E4.2 (according to the invention)

TABLE 12

| | Sample | |
|---|---|---|
| | E4.1 | E4.2 |
| 2-Mercaptopropionic acid | | 1.5 |
| BYK-392 | | 4.25 |
| Methyl-isoamyl-ketone | 24 | 22 |
| Methyl-amyl-ketone | 24 | 10.25 |
| Ethyl-ethoxy-propionate | | 14.25 |
| Exxsol D30 | | 37.75 |
| Butylcellosolve acetate ® | | 10 |
| Acetyl acetone | 50 | |
| Byk 320 | 2.0 | |

The two car body resprays were performed in a spray booth at 35° C. and 25% humidity. The car bodies used were similar to a normal sized 5-door passenger car. The two samples were sprayed 15 minutes after the preparation of the ready-to-spray compositions. The top coat was applied in two layers, with 5-10 minutes flash-off between the layers. After the top coat had been applied, there was no flash-off time and the applied coating was cured at 60-65° C. for 35 minutes.

TABLE 13

| | Sample 4 | |
|---|---|---|
| | E4.1 | E4.2 |
| Pinholes | 5 | 9 |
| EHO | 7 | 8 |
| Sprayability first layer | 7 | 7 |
| Sprayability second layer | 6 | 7 |
| Warm tackiness | 8 | 7 |
| Flow | 7 | 8 |

The results in Table 13 demonstrate improvements in pinhole sensitivity, EHO, sprayability, and flow of sample E4.2 over E4.1.

Example 5

Application of 420 g/l top coats in an industrial manner (e.g. airless/electrostatic apparatus) can be problematic due too significant amounts of air entrapment in top coats. Air entrapment causes pinholes during curing. This example shows the advantage of thinner sample E5.2 according to the invention over comparative Example E5.1 based on known catalyst blocking compounds. These two samples were used together with the Sikkens™ Autocoat BT LV 351™ Topcoat and Hi Flo hardener. The Sikkens™ Autocoat BT LV 351™ is a solvent borne 420 g/l polyester/polyacrylate polyol-isocyanate top coat system. Polyester polyol: f(OH)=4.4; NVC=80%; $t_g$=−2° C. Polyacrylate polyol: f(OH)=4.1; NVC=74%, $t_g$=20° C. The ready-to-spray mixture was prepared according to the technical data sheet of the product. The red colour Ral 3020 was selected as the A-component and prepared from the top coat toner assortment of Sikkens™ Autocoat BT LV 351™. Organic pigmented top coats (e.g. red/blue) are known to have relatively high pinhole sensitivity. Application of the two ready-to-spray mixtures was performed on steel panels precoated with sanding filler. Subsequently the two samples were applied with a Graco airless spraying apparatus and immediately cured at 60° C. for 30 min. No flash off time was used.

TABLE 14

| | Sample | |
|---|---|---|
| | E5.1 | E5.2 |
| 2-Mercaptopropionic acid | | 1.5 |
| BYK-392 | 2.0 | 4.5 |
| Ethyl-ethoxy-propionate | 45.5 | 36.5 |
| Butylcellosolve ®-acetate | | 25 |
| SBP 140/165 | 28.0 | 30 |
| DBTL | 0.3 | 0.3 |
| n-Butylacetate | 2.7 | 1.35 |
| Xylene | | 1.35 |
| PTMP | 1.5 | |
| Acetylacetone | 20.0 | |

TABLE 15

| | Example | |
|---|---|---|
| | E5.1 | E5.2 |
| Pinholes | 4 | 9 |
| Warm tackiness | 8 | 7 |

The results in Table 15 clearly demonstrate the improvements in pinhole sensitivity of coating E5.2 according to the invention. The warm tackiness indicates the curing is almost on the same level as in comparative Example E5.1. Hence, it has been demonstrated that the balance of properties has been improved.

Example 6

Example 6 demonstrates the influence of the functionality of the polyol used in the coating composition. Example E6.1 is an example according to the invention, containing a acrylic polyol having an average functionality of 6.2 hydroxyl groups. Example E6.2 is a comparative Example wherein the acrylic polyol of Example E6.1 was replaced with an acrylic polyol having an average functionality of 3.0 hydroxyl groups. The other properties of the acrylic polyols used in these Examples, in particular glass transition temperature and molecular weight, were the same. The amount if acrylic polyols in Examples E6.1 and E6.2 was selected such that the total amount of hydroxyl groups was the same in both compositions. The amount of additives was selected such that their proportion on non-volatile content was the same in both compositions. Hence, any differences in the coating compositions and the coatings can be attributed to the difference in functionality. The components of the compositions are summarized, in parts by weight, in Table 16.

TABLE 16

| Clearcoat composition | E6.1 | E6.2 |
|---|---|---|
| Acrylic polyol (f(OH) = 6.2; NVC = 65%, OH number = 140 Mg KOH/g | 55.6 | |
| Polyester polyol (f(OH) = 2.8; NVC = 100%; $T_g$ = −59° C. OH number = 303 mg KOH/g | 19.9 | 19.9 |
| Acrylic polyol f(OH) = 3.0 NVC = 63.8% OH number = 67.3 | | 117.8 |
| n-butylacetate | 16.1 | 21.9 |
| Ethyl-ethoxy-propionate | 0.9 | 0.9 |
| SBP 140/165 | 4.5 | 4.5 |
| Tolonate HDT LV/Desmodur XP 2511 | 44.9 | 44.9 |
| Ethyl-ethoxy-propionate | 9.6 | 9.6 |
| n-butylacetate | 9.6 | 9.6 |
| DBTL | 0.20 | 0.28 |
| Methylamyl ketone | 6.6 | 6.6 |
| SBP 140/165 | 8.9 | 8.9 |
| Tinuvin 292 | 1.1 | 1.4 |
| BYK-355 | 0.1 | 0.14 |
| BYK-331 | 0.1 | 0.14 |
| BYK-392 | 0.5 | 0.7 |
| 2-Mercaptopropionic acid | 0.24 | 0.33 |
| VOC (g/L) | ≤420 | ≤420 |

In Table 17 the viscosity development at 20° C. of samples E6.1 and E6.5 measured by DIN cup 4 is summarized.

TABLE 17

Viscosity increase (pot life) DC 4, 20° C.

| Sample | $T_0$ min | $T_{15}$ min | $T_{30}$ min | $T_{45}$ min |
|---|---|---|---|---|
| E6.1 | 15.3 | 15.8 | 16.0 | 16.4 |
| E6.2 | 18.0 | 19.2 | 19.7 | 20.1 |

From Table 17 it can be inferred that sample E6.1 according to the invention has a lower starting viscosity than comparative sample E6.2. furthermore, the viscosity of sample E6.2 increases faster. In can be concluded that clearcoat sample E6.1 according to the invention can be longer processed can be longer processed that comparative sample E6.2.

The drying rate of applied coatings from samples E6.1 and E6.2 at 20° C. and at 60° C. was determined using a BK drying recorder. The results are summarized in Table 18.

TABLE 18

| Sample | Phase 1 (cm) | Phase 2 (cm) | Phase 3 (cm) |
|---|---|---|---|
| Drying recorder results at 20° C. | | | |
| E6.1 | 7 | 7 | 5.1 |
| E6.2 | 4.8 | 20.0 | nd |
| Drying recorder results at 60° C. | | | |
| E6.1 | 2.9 | 0.6 | 2.9 |
| E6.2 | 3.0 | 3.9 | 3.8 |

The overall drying time of clearcoat sample E6.1 according to invention is shorter then E6.2, both at 20° C. and 60° C. degrees Celsius. This is particularly surprising, as the viscosity increase in the pot of sample E6.1 is slower, as demonstrated above.

The clearcoat compositions were sprayed by a coating robot, 20 minutes after mixing, at 22° C. and 45% humidity. Steel panels were used a substrate. The substrates were pre-coated successively with a sanding filler and a water borne, deep black, basecoat. Once the coating had been applied, the panels were left for five minutes flash off time before being transferred to an oven kept at 60° C. The clearcoat panels were cured for 40 minutes and left for 24 hours before being judged.

TABLE 19

Visual characteristics of the clear coats

| Sample | EHO | Sagging | Pinholes |
|---|---|---|---|
| E6.1 | 9-10 | 9-10 | 9-10 |
| E6.2 | 8-9 | 8-9 | 6-7 |

Form table 19 it can be inferred that clearcoat formulation E6.1 has better visual properties and less defects compared to sample E6.2. Sample E6.1 according to the invention was rated better for enamel hold out and sagging. A significant difference was observed in solvent pop (pinhole) sensitivity. Comparative clear coat E6.2 was judged on average 6-7 (on a scale of ten), while sample E6.1 was judged on average a 9-10.

From the results of Example 6 it can be concluded that sample E.6.1 according to the invention exhibits a slower viscosity increase, i.e. longer potlife, faster drying, and better visual properties than the comparative sample E6.2. The only difference between these samples is the functionality of the polyol used in both samples. Hence, the improved properties of sample E6.1 can be attributed to the use of a polyol having a average functionality of more than 3 hydroxyl groups per molecule.

The invention claimed is:

1. A non-aqueous coating composition consisting essentially of,
   a) an aliphatic or cycloaliphatic polyisocyanate,
   b) a polyol having an average functionality of more than 3 hydroxyl groups per molecule, wherein the polyol is selected from polyester polyols, polyacrylate polyols, polycarbonate polyols, polyurethane polyols, melamine polyols, and mixtures thereof,
   c) the reaction product of
      i) a metal based curing catalyst for the addition reaction of isocyanate groups and hydroxyl groups, based on a metal selected from the group consisting of tin, bismuth, zirconium, and mixtures thereof and
      ii) a mercapto carboxylic acid, and
   d) optionally, a volatile organic solvent,
   wherein the coating composition does not contain a carboxylic acid wherein the carbonyl group of the carboxylic acid is in conjugation with a π-electron system.

2. The coating composition according to claim 1, wherein the catalyst for the addition reaction of isocyanate groups and hydroxyl groups is based on tin.

3. The coating composition according to claim 1, wherein the amount of metal based curing catalyst is in the range of 0.001 to 10 weight-%, calculated on the non-volatile matter of the composition.

4. The coating composition according to claim 1, wherein the mercapto carboxylic acid is selected from the group consisting of 2-mercapto-carboxylic acids, 3-mercapto-carboxylic acids, and mixtures thereof.

5. The coating composition according to claim 1, wherein the amount of mercapto carboxylic acid is in the range of 0.1 to 18 weight-%, calculated on the non-volatile matter of the composition.

6. The coating composition according to claim 1, wherein component b) is a mixture of a polyester polyol and a polyacrylate polyol.

7. The coating composition according to claim 1, wherein the composition comprises the volatile organic solvent.

8. The coating composition according to claim 6, wherein the amount of volatile organic solvent does not exceed 420 g/l of coating composition.

9. A kit of parts for preparing a coating composition according to claim 1, the kit of parts consisting essentially of
   a) the polyol,
   b) the polyisocyanate, and
   (c) a metal based curing catalyst for the addition reaction of isocyanate groups and hydroxyl groups, based on a metal selected from the group consisting of tin, bismuth, zirconium, and mixtures thereof,
   (d) a mercapto carboxylic acid; and
   (e) optionally, a diluent module comprising a volatile organic solvent;
   wherein the metal based catalyst for the addition reaction of isocyanate groups and hydroxyl groups and the mercapto carboxylic acid are distributed, individually or in combination, over one or more of the modules.

10. The kit of parts according to claim 9, wherein the kit of parts comprises the diluent module comprising a volatile organic solvent.

11. A method for forming a coating layer, the method comprising applying the coating composition according to claim 1 to an automobile or a transportation vehicle.

12. The method according to claim 11, wherein the formed coating layer is a layer in a multi-layer lacquer coating.

13. The method according to claim 11, wherein the formed coating layer is a top coat layer in a multi-layer lacquer coating.

14. A process of coating a substrate comprising
   i) applying the coating composition according to claim 1 to a substrate, and
   ii) curing the coating composition at a temperature in the range of 40 to 80° C.

15. The process of coating a substrate according to claim 14, wherein component b) is a mixture of a polyester polyol and a polyacrylate polyol and the amount of volatile organic solvent does not exceed 420 g/l of coating composition.

16. The kit of parts according to claim 10 wherein the metal based catalyst for the addition reaction of isocyanate groups and hydroxyl groups and the mercapto carboxylic acid are distributed, individually or in combination, only over one or more of modules a) and c).

* * * * *